Patented Feb. 9, 1932

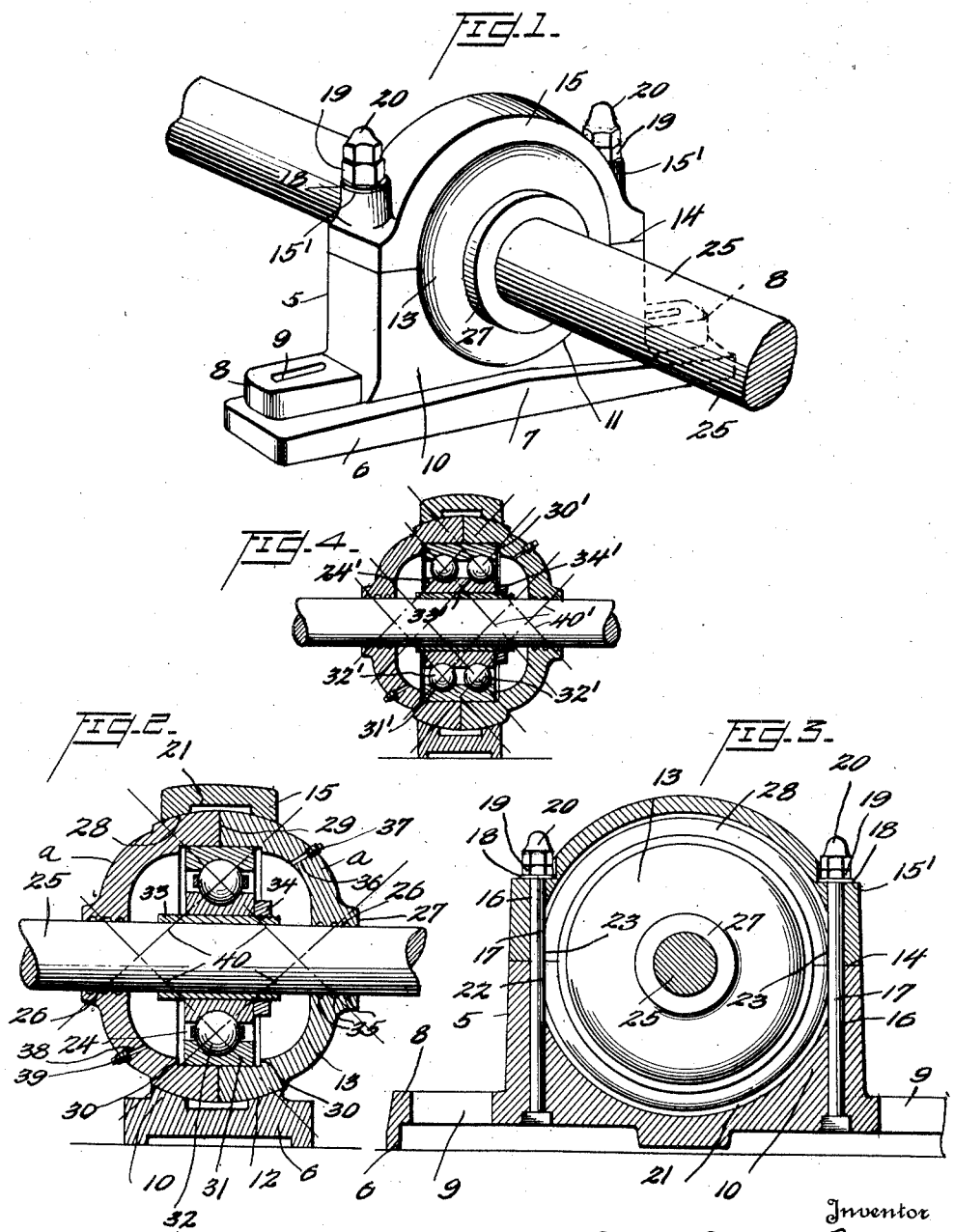

1,844,552

UNITED STATES PATENT OFFICE

JOSEPH OSWELL BAILEY, OF ATLANTA, GEORGIA

SELF-ALIGNING BEARING

Application filed May 12, 1928. Serial No. 277,317.

Broadly this invention relates to shaft bearings but it is more particularly directed to the spherical or self-aligning block type.

An important object of this invention is the provision of a bearing housing assembly, so designed that the bearing and its housing constitutes a unitary self-aligning bearing adapted to follow the movements of the shaft to compensate for shaft deflection and oscillation, to prevent grinding pressure and consequent shaft crystallization, as well as elongation of the openings through which the shaft is mounted.

Another object of this invention is the provision of a bearing housing assembly comprising a spherical housing member adapted to embrace a shaft bearing, vertically divided into two halves, and a base and cap member longitudinally divided, adapted to embrace the spherical housing to form a unitary bearing housing assembly so as to withstand radial and thrust load stresses without binding engagement with the shaft.

A further object of this invention is the provision of a spherical bearing housing assembly of this character, comprising few parts adapted to be easily assembled in operative position and readily movable on the shaft to different positions without the necessity of completely disassembling the device as is now prevalent.

A still further object of this invention is the provision of an oil tight, dust proof bearing housing assembly adapted to embrace either a single or double ball bearing, whereby thrust lines will radiate from center of shaft to center of balls, irrespective of the angle of deflection of the shaft.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a perspective view of my improved spherical bearing assembly;

Fig. 2 is a cross sectional view of the device with the shaft in elevation;

Fig. 3 is a longitudinal section with the bearings removed; and

Fig. 4 is a similar view to Fig. 2 of a double raceway bearing.

The devices of this character with which I am familiar, embracing self-aligning bearings, the alignment is within the bearing inside of the housing, so that when the shaft deflects it will strike the casing where the felts are usually used on the outside of the housing, thus setting up a grinding pressure bringing about shaft crystallization as well as the elongation of the openings through which the shaft is mounted, and it was to overcome such deficiencies and to provide a spherical type bearing housing adapted to follow the shaft, so mounted with respect to the base and cooperating cap structure as to preclude any opening up of said housing, owing to every point of contact being forced to a common center by virtue of its embracing support, thereby effecting an aligning coaction between the spherical housing and the base assembly in which it is mounted, whereby thrust stresses will at all times radiate from center of shaft to center of balls, irrespective of the angle of deflection of said shaft, that I designed the device forming the subject matter of this invention.

In the illustrated embodiment characterizing this invention there is shown a journal housing 5, in the present instance, of the pillow block box type, formed with a substantially rectangular supporting base 6 thickened at the center as at 7 and tapering therefrom to its opposite ends. The said base 6 is formed adjacent each end with an integral block or lip portion 8, of less width than the base, and provided with an aperture 9 through which is adapted to extend a bolt or other suitable fastening element and slotted or elongated to permit adjustment of said base on its support.

The base 6 is also formed intermediate the lips 8 with a standard or supporting block 10 having a circular opening 11 extending therethrough, the inner wall of said opening being concaved to form a socket like seat 12 for the spherical housing 13 as will hereinafter more fully appear.

The said block 10 is divided in a longitudinal plane as at 14 to form the removable cap portion 15 formed on opposite sides with shoulders 15'. Vertical apertures 16 extend through said shoulders and the block 10 and are adapted to receive bolts 17 on the upper ends of which are mounted washers 18, nuts 19 and threaded cap nut 20, by means of which the cap portion 15 is firmly secured to the block portion 10. The seat 12 is formed with a centrally disposed annular groove 21 extending slightly beyond the concaved surface to reduce friction and provide an oilway when the spherical housing is operatively positioned, and it will also be noticed the bolts 17 tangentially intersect the seat 12 as at 22 and engage the respective flattened portions 23 of the said spherical housing 13 to limit its universal movement as will hereinafter more fully appear.

A journal or bearing 24 is mounted on a shaft 25 and is adapted to seat in and be embraced by the spherical housing 13 formed on opposite sides with aligned openings 26 through which extends the shaft 25. The casing surrounding each of the said openings is formed with a lateral flange 27 adapted to strengthen the housing and provide a greater bearing surface, and with piston fit to the shaft thereby effecting a dust and oil tight seal, which construction is possible by reason of the bearing 24 and housing 13 assembly being adapted to follow any disalignment or deflection of the shaft with respect to the supporting block structure 10 as will presently more fully appear.

The spherical housing 13 is formed with a circumferential band 28 machined to a true spherical radius corresponding to that of the seat 12 in which it is adapted to seat when operatively positioned in the block portion 10, as will be apparent without further description. The said housing 13 is split or divided on the center line 29 to form two halves or semi-spherical sections a, each of which sections are countersunk as at 30 adjacent their meeting edges to form a seat for the journal or shaft bearing 24 when the sections are operatively assembled thereover.

The bearing 24 is preferably constructed with deep raceway 31 having arc contact with balls 32, said bearing being mounted on adapter sleeve 33 threaded to engage the adapter nut 34 by means of which it is secured to shaft 25.

In some cases it is desirable to form the bearing surface of flange 27 with a plurality of oil grooves 35 adapted to effect an even more nearly perfect dust and oil seal than the piston fit as above described. The cap portion 15 is formed with an aperture 36 through which oil is introduced to the interior, said aperture being closed by threaded or other suitable oil plug 37, and through the lower portion of the housing 10 extends a small drain outlet opening 38, closed by a drain plug 39. The lines indicating thrust stresses above referred to as radiating from center of balls 32 to the center of shaft 25, irrespective of the angle of deflection of the shaft with respect to the supporting housing 5, are indicated as at 40.

Fig. 3 illustrates a modified form of the device identical to the one above described, with the exception of the employment of a double ball bearing, 24' adapted to seat in correspondingly deeper countersunk portions 30'. Bearing 24' is provided with a double row of raceways 31' which are adapted to travel balls 32', which structure is mounted on a longer adapter sleeve 33' secured to the shaft by adapter nut 34', stress lines being indicated at 40', the remainder of the structure being identical to the form above described.

It is apparent from the above, that to assemble the device it is but necessary to secure the bearing 24 on the shaft 25 where desired and bring the spherical sections a—a together in embracing relation with respect to the said bearing 24, which is effected without the use of wrenches, screwdrivers, locking nuts or tools of any kind, next place the assembled housing 13 in block 10, with the band portion 28 in engagement with seat 12, and position cap portion 14 thereover and secure to said block by tightening nuts 19 on bolts 17, and as the cap 14 and block 10 are drawn towards each other the pressure thereof on housing 13 will force into binding engagement the meeting edges of the two side sections a—a, and so maintain them, as every point of contact of the said components is forced to a common center, preventing any opening up or separation of parts, and adapted to withstand both radial and thrust load stresses without any further binding method being necessary.

It will be observed that the lines of separation of the spherical housing 13 and the socket or block housing 10 are at right angles to each other and that only two bolts are necessary to lock the assembly in operative position.

While I have above described the bolts 17 as intersecting the seat 12 and the spherical housing 13 as formed with flattened portions 23 on the opposite sides thereof, it is to be understood that it may be advisable to omit these flattened portions and not have the bolts 17 intersecting the seat 12 if desired.

From the above it is apparent that I have designed a self-aligning ball bearing assembly of simple construction, adapted to a variety of uses and susceptible of long and continued usage under heavy duty and double heavy duty, and manufacturable at a reasonable cost and efficient for the purposes intended.

Although in practice I have found that the form of my invention illustrated in the accompanying drawings and referred to in the above description, as the preferred embodiment is the most efficient and practical; yet realizing the conditions concurrent with the adoption of my invention will necessarily vary, I desire to emphasize that various minor changes in details of construction, proportion and arrangement of parts, may be resorted to within the scope of the appended claim without departing from or sacrificing any of the principles of this invention.

Having thus described my invention, what I desire protected by Letters Patent is as set forth in the following claim:

A device of the character described comprising a ball housing embodying hemispherical shells, each shell being formed adjacent its meeting edge with a circumferential raised portion, which combined forms a convexed seat, each shell also formed interiorly adjacent said edge with a circumferential seat adapted to support a ball bearing, a pillow block comprising base and cap hollowed out portions provided with an annular groove forming a concaved seat on opposite sides thereof, whereby said groove is adapted to overlie the jointure of said shells and provide an oil way and said concaved seats engage the convexed raised portion to maintain the shells in united relation and the bearing in its seat, and effect universal movement between said housing and pillow block.

JOSEPH OSWELL BAILEY.